(12) United States Patent
Vassallo et al.

(10) Patent No.: US 6,374,790 B1
(45) Date of Patent: Apr. 23, 2002

(54) MODEL AIRPLANE ENGINE HAVING A HEATED BACKPLATE

(75) Inventors: Franklin A. Vassallo; C. David Gierke, both of Lancaster, NY (US)

(73) Assignee: Veritay Technology, Inc., East Amherst, NY (US)

( * ) Notice: Subject to any disclaimer, the term of this patent is extended or adjusted under 35 U.S.C. 154(b) by 0 days.

(21) Appl. No.: 09/557,110

(22) Filed: Apr. 24, 2000

Related U.S. Application Data

(60) Provisional application No. 60/131,479, filed on Jun. 17, 1999.

(51) Int. Cl.[7] .................................................. H05B 1/02
(52) U.S. Cl. .............................................. 123/142.5 R
(58) Field of Search .................... 123/142.5 E, 142.5 R, 123/DIG. 3, 179.27

(56) References Cited

U.S. PATENT DOCUMENTS

| | | | |
|---|---|---|---|
| 4,002,882 A | 1/1977 | McCutchen | 219/499 |
| 4,771,968 A | * 9/1988 | Perry | 244/54 |
| 4,901,686 A | * 2/1990 | Scott | 123/142.5 E |
| 5,938,963 A | * 8/1999 | Tanis | 219/551 |

OTHER PUBLICATIONS

2–Stroke Glow Engines for R/C Aircraft, vol. 1, Model Airplane News, 1994, Air Age Inc, pp. 11, 12, 31–34.

* cited by examiner

*Primary Examiner*—Willis R. Wolfe
*Assistant Examiner*—Hyder Ali
(74) *Attorney, Agent, or Firm*—Martin LuKacher, Esq.

(57) ABSTRACT

A model airplane engine uses a heated backplate to replace the conventional, non-heated backplate of the engine. The backplate incorporates a heater, which is electrically, temporarily energized during the start cycle of the engine. The higher temperature of the engine results in vaporization of the fuel prior to its entry into the combustion cylinder thus preventing crankcase and cylinder flooding and allowing easy starts during operation in cold weather, and also makes possible the use of inexpensive low-volatility heavier fuels, rather than special, expensive fuels.

5 Claims, 1 Drawing Sheet

MODEL AIRPLANE ENGINE HAVING A HEATED BACKPLATE

This application claims the priority benefit of U.S. Provisional Application Serial No. 60/131,479, filed Jun. 17, 1999.

DESCRIPTION

The present invention relates to engines useful in model airplanes and like and particularly to two-stroke engines for model airplane and similar applications.

The invention is especially suitable for use in a model airplane engine or like engine to facilitate starting the engine, especially in a cold temperature environment (e.g. under 10° C.) and to enable the use of fuel that is heavier and less combustible than fuels conventionally specified for use in such an engine.

Briefly, the invention may be carried out by providing an engine with a heated backplate assembly. An engine embodying the invention may be provided by either replacing the standard backplate in said engines with an electrically,heated backplate assembly, or retrofitting an existing backplate with the heater.

Model airplane engines are notoriously hard to start in cold weather. Furthermore, such engines require for their operation special fuels, such as nitromethane-methanol mixtures, which are expensive and hazardous to use because of their high volatility.

In accordance with the invention, it was discovered when a standard engine backplate is replaced with a backplate that is heated, as by incorporating therein a resistive, electrically heated element, an improved engine is provided which is easier to start and does not require special fuel as is the case for the standard engine. During start, the heating element is temporarily energized from a battery, heating the engine to a temperature sufficient to vaporize the fuel prior to its entry into the combustion cylinder. Because no liquid fuel enters the cylinder, crankcase and cylinder flooding are prevented. Under these conditions the engine easily starts in cold, ambient temperatures. The improved engine can use heavier, less volatile fuels, e.g. Jet "A" fuel. After the engine starts the heating element is disconnected from said battery.

Related technology to this invention, includes C. W. Mc Cutchen in U.S. Pat. No. 4,002,882 which describes a heating circuit for model airplane engines designed, unlike the present invention, to heat the ignition glow plug of the engine. Additionally, operation and construction of model airplane engines is described in a book entitled "2-Stroke Glow Engines for R/C Aircraft", V.1, Model Airplane News, 1994, Air Age Inc., p.p. 11,12, and 31–34.

A further feature of this invention is to provide a method for fabricating improved engines by providing a selection of backplate assemblies in configurations and sizes that facilitate the installation a said backplate assemblies in a majority of models and makes of model airplane engines.

The invention will become more apparent from a reading of the following description in connection with the accompanying drawing which, briefly described, are as follows.

Figure 1:
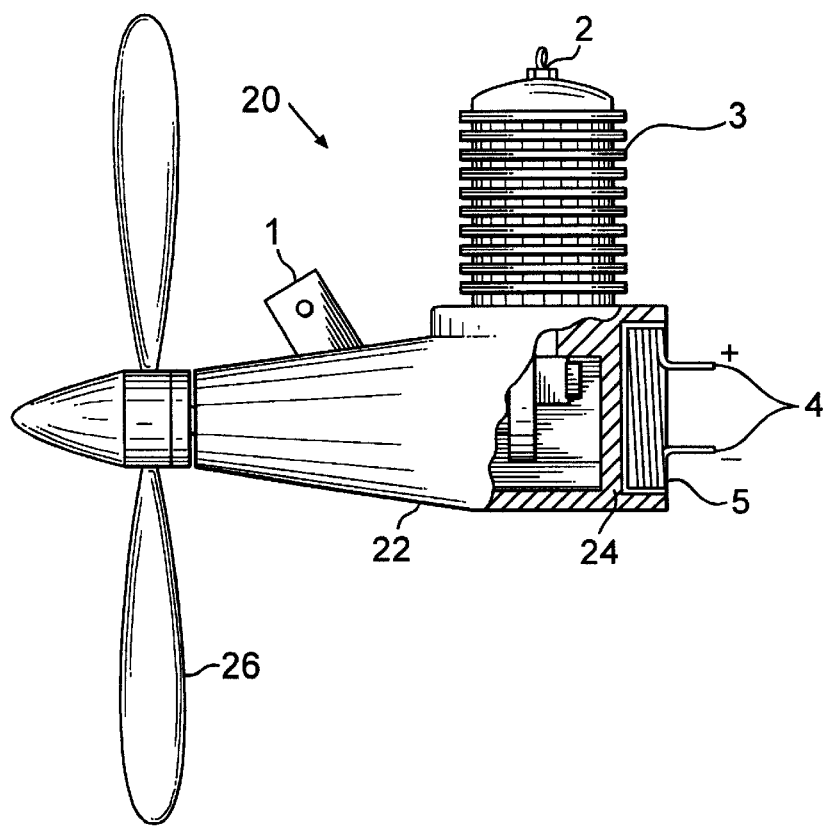
FIG. 1 is a diagrammatic elevational view of model aircraft engine according to the present invention, which incorporates an electrical heater in its backplate.

Referring to FIG. 1 there is shown a standard model airplane engine 20, and as a typical two stroke engine a Venturi tube 1 permits the entry of air and creates a reduced air pressure to draw fuel into a cylinder 3. A glow ignition plug 2 is captured at the top of the cylinder 3. A housing, or casing 22 of the engine 20 includes a block 24 having a backplate wherein a resistance wire coil 5 is embedded. The resistance wire coil (a heater or heating element) is temporarily, electrically heated by connecting a storage battery to the coil terminal 4. While the backplate is shown as part of the block with a cavity therein for receiving the heater, a separate backplate assembly, such as shown in FIG. 2 is preferred.

Figure 2:
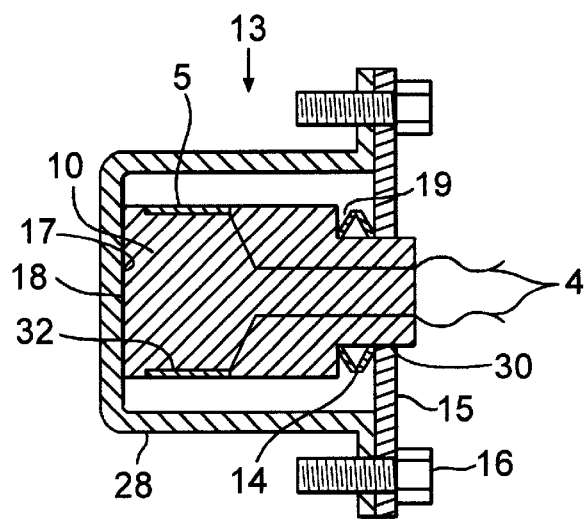
FIG. 2 is a section of an embodiment of a heated backplate assembly useful in providing improved engines according to the invention.

FIG. 2 is a sectional, elevational view of such a model airplane engine backplate assembly 13 that is connected to the engine block. The backplate 13 incorporates an electrical heater. The backplate assembly, which may include a retainer plate 15. The plate may be a wall of the engine housing. Alternatively, the retainer may be juxtaposed against, and in thermal contact with the engine block at the back of the engine housing 22 (the end opposite to where the propeller 26 is attached—see FIG. 1). A flanged cover or housing 28 is bolted to the retainer plate 15, such that the engine backplate is terminated by the retainer plate 15. A cylindrical heater body 10, made of suitable heat-resistant and thermally conductive material such as aluminum, protrudes into an opening 30 in the retainer plate 15. The heater body 10 has a step which forms a recess 19, into which is inserted a plurality of Bellville springs 14. These exert a force on the heater body 10, pressing it against the contact surface 18 of the housing 28. To provide good thermal contact to the housing 28 of the backplate assembly 13 and therefore to the body of the engine, a layer 17 of thermally conductive grease is interposed between the surface of said heater body 10 and the contact surface 18.

The heating coil 5, made of electrically resistive wire and insulated with heat-tolerant ceramic insulation, is wound in an annular recess 32 of the heater body 10. Terminals 4 of the heating coil 5 protrude to the exterior of said engine through said heater body 10 and are accessible such that a storage battery can be temporarily connected to said terminals 4 using suitable clips or connectors. The heater coil is designed to temporarily raise the temperature of the engine to a temperature sufficient to vaporize the fuel entering the cylinder 3.

Alternatively, if the housing 28 and retainer plate 15 are parts of standard model airplane engine backplates, the heater body 10 can be selected from a group (a selection) of such bodies. In other words, the heater body is designed with such dimensions that it can be used with several commonly used model airplane engine backplates, or a commercially available heater may be used.

Bolts 16 fasten the retainer plate 15 to the engine backplate. The retainer plate is fabricated with mounting holes to accommodate various engine models and makes.

It is to be understood that the preceding descriptions are illustrative only and that changes can be made in the heated backplate or backplate assembly, its components, materials and elements, as well as in all other aspects of this invention discussed herein without departing from the scope of the invention as defined in the claims. For example, the heater may be custom made to fit a specific model of said engine.

We claim:

1. A backplate closing a block and cylinder opening of a two-stroke model airplane engine in which opening a fuel-air mixture is present, said backplate comprising an electrically energizeable heater which raises the temperature of the fuel in the opening sufficiently to vaporize the fuel during engine starting, thereby providing a heated backplate, a retainer plate physically and thermally connected to said housing, said plate having a plurality of mounting holes to facilitate the mounting of said retainer on models and makes of model aircraft engines of different sizes.

2. A two-stroke engine for use in a model airplane comprising an engine block having an air-cooled cylinder connected thereto, a backplate including a heater attached to said block, said backplate being provided by a housing physically and thermally connected to said block, a retainer plate attached to said housing and providing a cavity, and a heater body of thermally conductive material in said cavity between said retainer plate and a wall of said housing.

3. The engine of claim 2 further comprising spring means capturing said heater body in said cavity in thermal contact with said wall and said retainer plate.

4. The engine of claim 2 wherein said housing provides said backplate.

5. A backplate closing a block and cylinder opening of a two-stroke model airplane engine in which opening a fuel-air mixture is present, said backplate comprising and electrically energizeable heater which raises the temperature of the fuel in the opening sufficiently to vaporize the fuel during engine starting, thereby providing a heated backplate, said backplate is a backplate assembly, said backplate assembly including a housing, a heater body retainer, and means for electrically energizing said heater body.

* * * * *